(12) United States Patent
Austin-Lane

(10) Patent No.: US 7,624,172 B1
(45) Date of Patent: *Nov. 24, 2009

(54) STATE CHANGE ALERTS MECHANISM

(75) Inventor: Christopher Emery Austin-Lane, Takoma Park, MD (US)

(73) Assignee: AOL LLC, Dulles, VA (US)

(*) Notice: Subject to any disclaimer, the term of this patent is extended or adjusted under 35 U.S.C. 154(b) by 1175 days.

This patent is subject to a terminal disclaimer.

(21) Appl. No.: 09/624,192

(22) Filed: Jul. 24, 2000

Related U.S. Application Data

(60) Provisional application No. 60/195,989, filed on Apr. 7, 2000, provisional application No. 60/189,974, filed on Mar. 17, 2000.

(51) Int. Cl.
 G06F 15/173 (2006.01)
 G06F 15/177 (2006.01)
 G06F 15/16 (2006.01)

(52) U.S. Cl. .............. 709/224; 709/207; 709/203; 709/217; 709/225; 709/223; 709/232; 709/227

(58) Field of Classification Search ............ 709/318, 709/206
 See application file for complete search history.

(56) References Cited

U.S. PATENT DOCUMENTS

| | | | |
|---|---|---|---|
| 5,557,659 A | 9/1996 | Hyde-Thomson | |
| 5,721,906 A | 2/1998 | Siefert | |
| 5,742,905 A | 4/1998 | Pepe et al. | |
| 5,774,670 A | 6/1998 | Montulli | |
| 5,793,365 A | 8/1998 | Tang et al. | |
| 5,878,219 A | 3/1999 | Vance, Jr. et al. | |
| 5,893,091 A * | 4/1999 | Hunt et al. | 707/3 |
| 5,893,099 A | 4/1999 | Schreiber et al. | |
| 5,920,692 A | 7/1999 | Nguyen et al. | |
| 5,951,643 A | 9/1999 | Shelton et al. | |
| 5,951,652 A | 9/1999 | Ingrassia, Jr. et al. | |
| 5,954,798 A | 9/1999 | Shelton et al. | |
| 5,991,791 A | 11/1999 | Siefert | |
| 6,009,413 A | 12/1999 | Webber et al. | |
| 6,012,051 A | 1/2000 | Sammon, Jr. et al. | |
| 6,014,638 A | 1/2000 | Burge et al. | |
| 6,021,433 A * | 2/2000 | Payne et al. | 709/219 |
| 6,026,403 A | 2/2000 | Siefert | |
| 6,026,429 A | 2/2000 | Jones et al. | |

(Continued)

FOREIGN PATENT DOCUMENTS

WO WO 97/10558 3/1997

(Continued)

OTHER PUBLICATIONS

"AOL technology: turning complicated things into engaging services", 1996 Annual Report, 22 pages.

(Continued)

Primary Examiner—Syed A. Zia
(74) Attorney, Agent, or Firm—Fish & Richardson P.C.

(57) ABSTRACT

A communications system including one or more alert gates and an alert controller. Each alert gate is configured to detect a different type of alert feed corresponding to a particular kind of alert. The alert controller is connected to the alert gates and operable to receive detected alerts from the alert gates and to deliver the detected alerts to a user of the communications system.

58 Claims, 13 Drawing Sheets

U.S. PATENT DOCUMENTS

| | | | |
|---|---|---|---|
| 6,085,223 | A | 7/2000 | Carino, Jr. et al. |
| 6,128,624 | A * | 10/2000 | Papierniak et al. ........ 707/104.1 |
| 6,151,584 | A | 11/2000 | Papierniak et al. |
| 6,166,730 | A | 12/2000 | Goode et al. |
| 6,195,651 | B1 * | 2/2001 | Handel et al. .................... 707/2 |
| 6,260,148 | B1 * | 7/2001 | Aggarwal et al. .............. 726/14 |
| 6,292,825 | B1 * | 9/2001 | Chang et al. ................. 709/206 |
| 6,301,609 | B1 * | 10/2001 | Aravamudan et al. ........ 709/207 |
| 6,351,761 | B1 * | 2/2002 | Cantone et al. .............. 709/202 |
| 6,360,252 | B1 * | 3/2002 | Rudy et al. .................. 709/206 |
| 6,381,594 | B1 * | 4/2002 | Eichstaedt et al. .............. 707/3 |
| 6,408,282 | B1 * | 6/2002 | Buist ......................... 705/36 R |
| 6,424,996 | B1 * | 7/2002 | Killcommons et al. ....... 709/206 |
| 6,425,006 | B1 * | 7/2002 | Chari et al. .................. 709/224 |
| 6,430,602 | B1 * | 8/2002 | Kay et al. .................... 709/206 |
| 6,430,604 | B1 * | 8/2002 | Ogle et al. ................... 709/207 |
| 6,442,598 | B1 * | 8/2002 | Wright et al. ................ 709/217 |
| 6,446,112 | B1 * | 9/2002 | Bunney et al. ............... 709/204 |
| 6,446,118 | B1 * | 9/2002 | Gottlieb ....................... 709/217 |
| 6,449,365 | B1 * | 9/2002 | Hodges et al. ............. 379/9.02 |
| 6,480,830 | B1 * | 11/2002 | Ford et al. ...................... 705/9 |
| 6,480,885 | B1 * | 11/2002 | Olivier ........................ 709/207 |
| 6,490,584 | B2 * | 12/2002 | Barrett et al. ................. 707/10 |
| 6,515,681 | B1 * | 2/2003 | Knight ......................... 715/751 |
| 6,529,586 | B1 * | 3/2003 | Elvins et al. ............. 379/88.13 |
| 6,539,375 | B2 * | 3/2003 | Kawasaki ....................... 707/5 |
| 6,594,682 | B2 * | 7/2003 | Peterson et al. ............. 718/102 |
| 6,600,725 | B1 * | 7/2003 | Roy ............................ 370/261 |
| 6,607,136 | B1 * | 8/2003 | Atsmon et al. ............... 235/492 |
| 6,691,162 | B1 * | 2/2004 | Wick ........................... 709/224 |
| 6,742,127 | B2 * | 5/2004 | Fox et al. ....................... 726/10 |
| 6,834,306 | B1 * | 12/2004 | Tsimelzon ................... 709/228 |
| 7,043,530 | B2 * | 5/2006 | Isaacs et al. ................. 709/206 |
| 7,370,278 | B2 * | 5/2008 | Malik et al. ................. 715/758 |
| 7,392,306 | B1 * | 6/2008 | Donner et al. ............... 709/224 |
| 2001/0012286 | A1 * | 8/2001 | Huna et al. ................... 370/352 |
| 2002/0023131 | A1 * | 2/2002 | Wu et al. ..................... 709/205 |
| 2002/0042830 | A1 * | 4/2002 | Bose et al. ................... 709/230 |
| 2004/0076272 | A1 * | 4/2004 | Zafar et al. ................ 379/88.13 |
| 2008/0258913 | A1 * | 10/2008 | Busey ......................... 340/540 |

FOREIGN PATENT DOCUMENTS

WO      WO 97/46955      12/1997

OTHER PUBLICATIONS

"YAHOO! Messenger Makes the World a Little Smaller, More Informed", pp. 1-2, Jun. 21, 1999.

Alan Cohen, "Instant Messaging", Apr. 13, 1999, PC Magazine, PC Labs, 2 pages.

"AOL Instant Messenger Windows Beta Features", Jun. 24, 1999, 2 pages, AOL Instant Messenger All New Version 2.0, 2 pages, Jun. 24, 1999, What is AOL Instant Messenger, 3 pages, Jun. 24, 1999, Quick Tips for Getting Started, 5 pages, Jun. 24, 1999, Frequently Asked Questions About AOL Instant Messenger, 6 pages, Jun. 24, 1999.

Office Action, U.S. Appl. No. 09/624,191, dated Feb. 22, 2005.

\* cited by examiner

STATE CHANGE ALERTS MECHANISM

This application claims the benefit of U.S. Provisional Application No. 60/195,989 filed Apr. 7, 2000 and claims the benefit of U.S. Provisional Application No. 60/189,974 filed Mar. 17, 2000.

TECHNICAL FIELD

The present invention relates generally to delivering information to a client. More particularly, the present invention relates to alerting a client of a state change within an online service.

BACKGROUND

Online service providers are constantly offering new services and upgrading existing services to enhance their subscribers online experience. Subscribers have virtually on-demand access to news, weather, financial, sports, and entertainment services as well as the ability to transmit electronic messages and to participate in online discussion groups. For example, subscribers of online service providers such as America Online or CompuServe may view and retrieve information on a wide variety of topics from servers located throughout the world. A server may be maintained by the service provider or by a third party provider who makes information and services available through the network of computers that make up the online service.

The proliferation of electronic mail (email) as a means of communication has facilitated the efforts of online service providers to develop and offer additional services to improve subscribers access to information. For example, a subscriber to America Online may register for a service that tracks stock ticker symbols designated by the subscriber and delivers a daily report directly to the subscriber by email at the end of each trading day. The daily report includes daily closing quote data, index quotes, a market news summary, news associated with the company identified by the ticker symbol, and relevant content links.

America Online offers a service that delivers information to a registered subscriber according to the subscribers profile. By setting up a subscriber profile specifying certain categories and/or search words, a registered subscriber can receive a daily newsletter containing articles that pertain to the subscribers profile. A subscriber can also receive a daily listing of Internet or online sites (links) related to the subscribers profiles and can register to receive reminder emails before holidays and/or other special occasions.

America Online also has provided subscribers with the ability to send and receive instant messages. Instant messages are private online conversations between two or more people who have subscribed to the instant messaging service and have installed the necessary software. Because such online conversations take place virtually in real time, instant messaging can provide immediate access to desired information. Instant messaging is fast becoming a preferred means of communicating among online subscribers.

SUMMARY

In one general aspect, a communications system includes one or more alert gates and an alert controller. Each alert gate is configured to detect a different type of alert feed corresponding to a particular type of alert. The alert controller is connected to the alert gates and operable to receive detected alerts from the alert gates and to deliver the detected alerts to a user of the communications system.

The alert controller may be configured to maintain a record of alert types registered for by the user of the communications system. The user may be a subscriber of an instant messaging system. The alert controller may deliver one or more detected alerts to the subscriber through the instant messaging system.

The user also may be a subscriber of an online service provider, and the alert controller may deliver one or more detected alerts to the subscriber through the online service provider. The alert controller may be connected to an instant messaging controller through a routing gateway.

The instant messaging controller and the alert controller may be assigned to the user of the communications system according to a hashing technique. Implementations may include multiple alert controllers.

At least one of the alert gates may detect an alert feed from a remote server by sending a status inquiry to the remote server. The remote server may be a mail server, a stock server, a third party server, a weather server and a news server, and/or a calendar server.

Implementations also may include an alert controller network having multiple alert controllers including the alert controller. The alert controller may be configured to communicate with all alert controllers in the alert controller network.

At least one type of alert feed may contain information related to a group, and the alert controller may be dedicated to receiving information related to certain members of the group. The group may be a group of users, a group of stocks, a group of third parties, and/or a group of cities.

In another general aspect, a user of a communications system is alerted by detecting, at an alert gate, an alert feed corresponding to an alert indicative of a change in state at a remote server; receiving, at an alert controller, detected alerts from the alert gate; and delivering a detected alert to a user of the communications system when the user has indicated a desire to receive the alert.

DESCRIPTION

For illustrative purposes, FIGS. 1-6 describe a communications system for implementing techniques for alerting a client of a state change within an online service. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
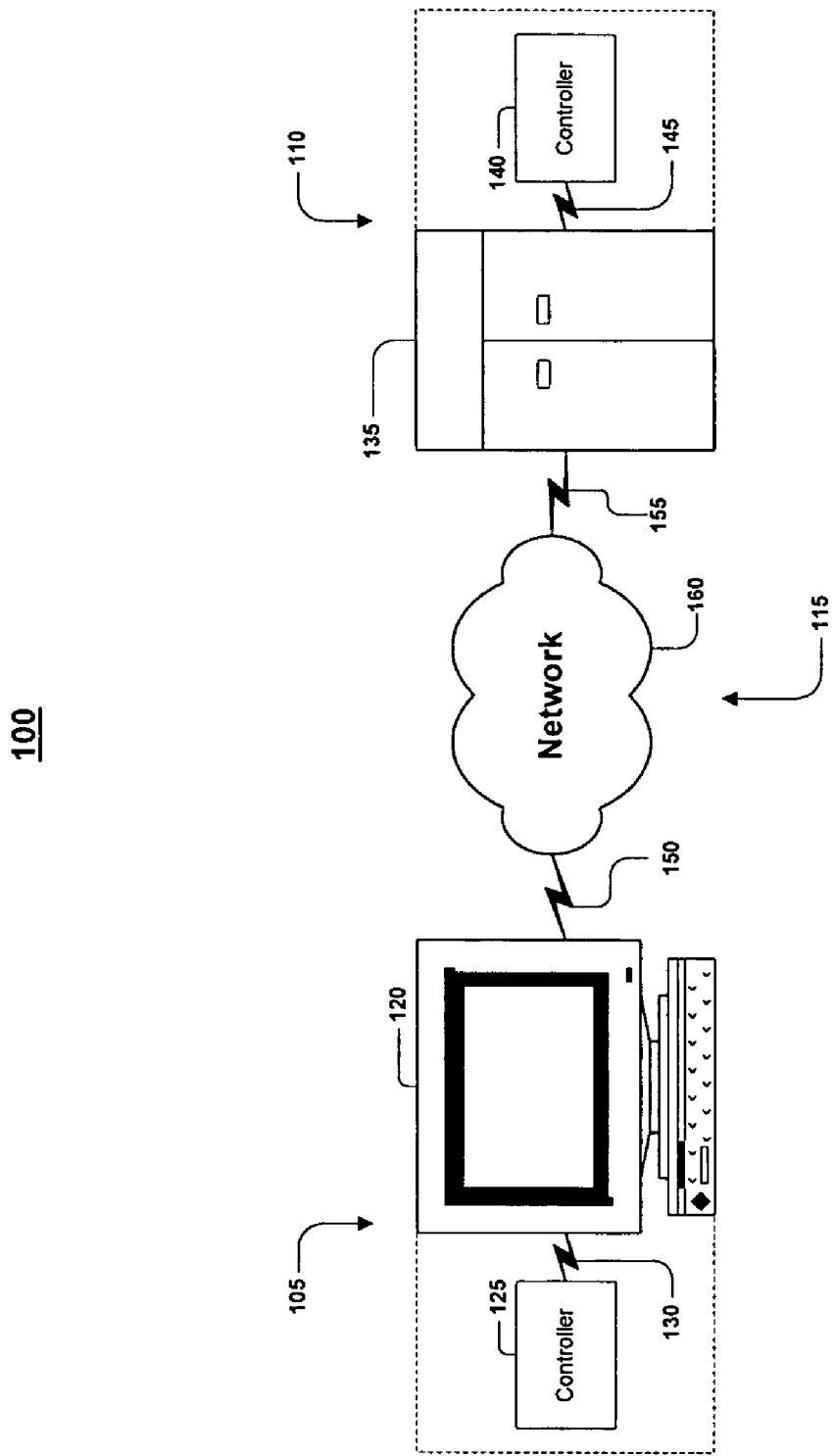
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125. For example, the client system 105 may include one or more general-purpose computers (e.g., personal computers), one or more special-purpose computers (e.g., devices specifically programmed to communicate with each other and/or the host system 110), or a combination of one or more general-purpose computers and one or more special-purpose computers. The client system 105 may be arranged to operate within or in concert with one or more other systems, such as for example, one or more LANs ("Local Area Networks") and/or one or more WANs ("Wide Area Networks").

The client device 120 is generally capable of executing instructions under the command of a client controller 125. The client device 120 is connected to the client controller 125 by a wired or wireless data pathway 130 capable of delivering data.

The client device 120 and client controller 125 each typically includes one or more hardware components and/or software components. An example of a client device 120 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of client controller 125 is a software application loaded on the client device 120 for commanding and directing communications enabled by the client device 120. Other examples include a program, a piece of code, an instruction, a device, a computer, a computer system, or a combination thereof, for independently or collectively instructing the client device 120 to interact and operate as described herein. The client controller 125 may be embodied permanently or temporarily in any type of machine, component, equipment, storage medium, or propagated signal capable of providing instructions to the client device 120.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, or xDSL), radio, television, cable, satellite, and/or any other delivery mechanism for carrying data. The communications link 115 may include communication pathways 150, 155 that enables communications through the one or more delivery networks 160 described above. Each of the communication pathways 150, 155 may include, for example, a wired, wireless, cable or satellite communication pathway.

The host system 110 includes a host device 135 capable of executing instructions under the command and direction of a host controller 140. The host device 135 is connected to the host controller 140 by a wired or wireless data pathway 145 capable of carrying and delivering data.

The host system 110 typically includes one or more host devices 135 and/or host controllers 140. For example, the host system 110 may include one or more general-purpose computers (e.g., personal computers), one or more special-purpose computers (e.g., devices specifically programmed to communicate with each other and/or the client system 105), or a combination of one or more general-purpose computers and one or more special-purpose computers. The host system 110 may be arranged to operate within or in concert with one or more other systems, such as, for example, one or more LANs ("Local Area Networks") and/or one or more WANs ("Wide Area Networks").

The host device 135 and host controller 140 each typically includes one or more hardware components and/or software components. An example of a host device 135 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of host controller 140 is a software application loaded on the host device 135 for commanding and directing communications enabled by the host device 135. Other examples include a program, a piece of code, an instruction, a device, a computer, a computer system, or a combination thereof, for independently or collectively instructing the host device 135 to interact and operate as described herein. The host controller 140 may be embodied permanently or temporarily in any type of machine, component, equipment, storage medium, or propagated signal capable of providing instructions to the host device 135.

Figure 2:
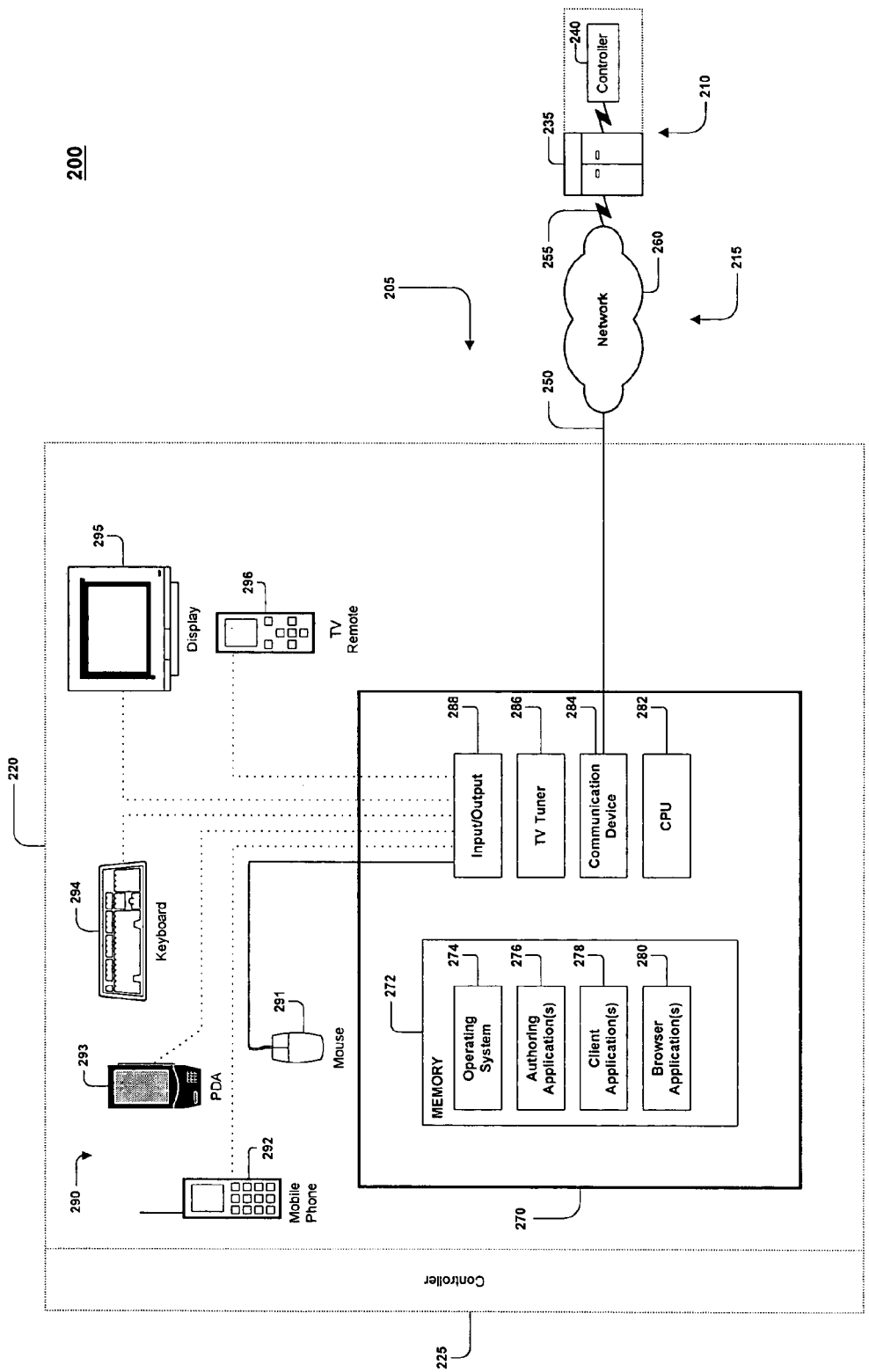
FIGS. 2-6 are expansions of aspects of the block diagram of FIG. 1.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to and illustrates one possible embodiment of the client system 105 of FIG. 1.

The client device 220 typically includes a general purpose computer 270 having an internal or external storage 272 for storing data and programs such as an operating system 274 (e.g., DOS, Windows™, Windows 95™, Windows 98™, Windows 2000™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 for wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, and/or a TV remote control 296 for receiving information from and rendering information to subscribers.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
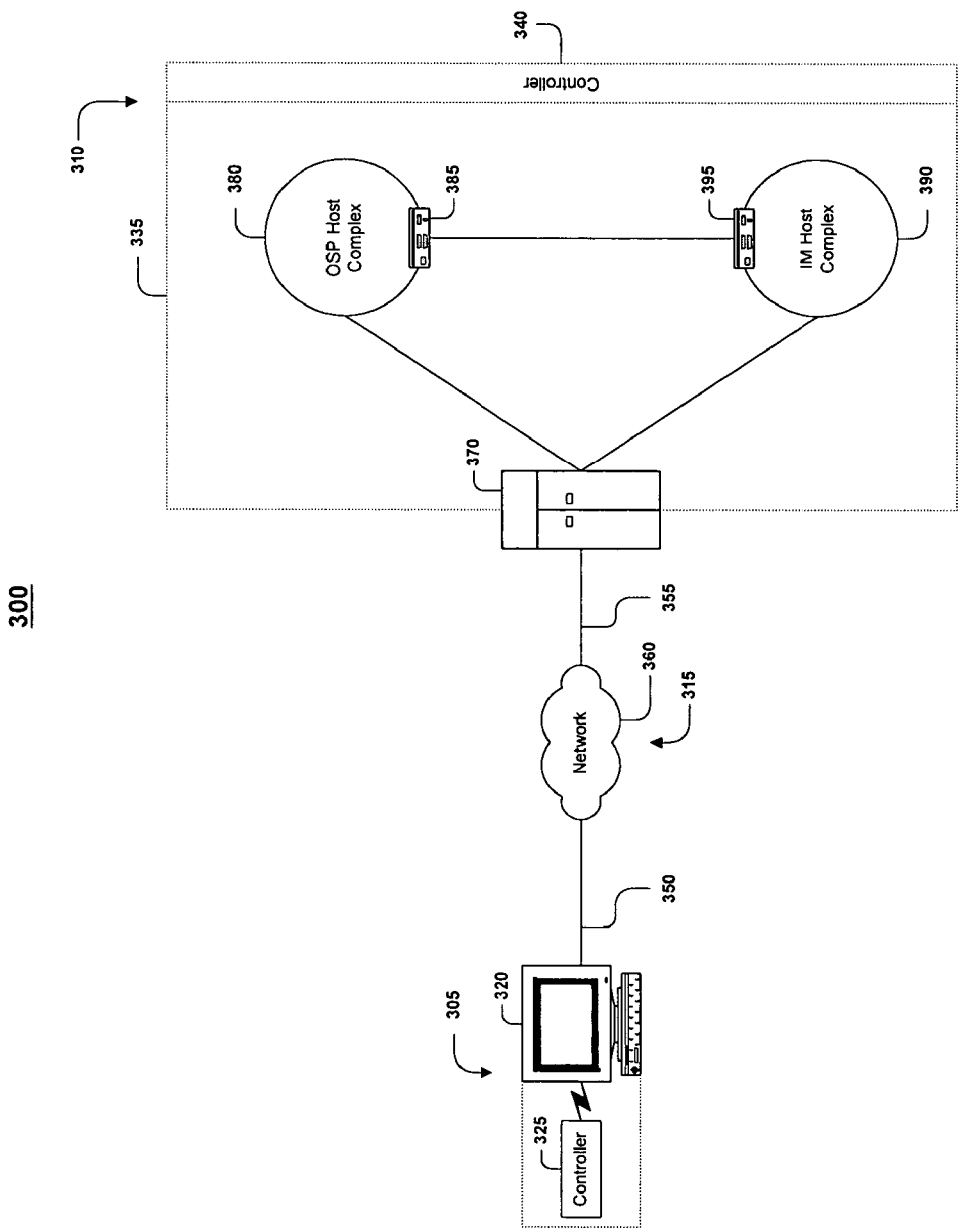

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible embodiment of the host systems 110 and 210 shown in FIGS. 1 and 2, respectively.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
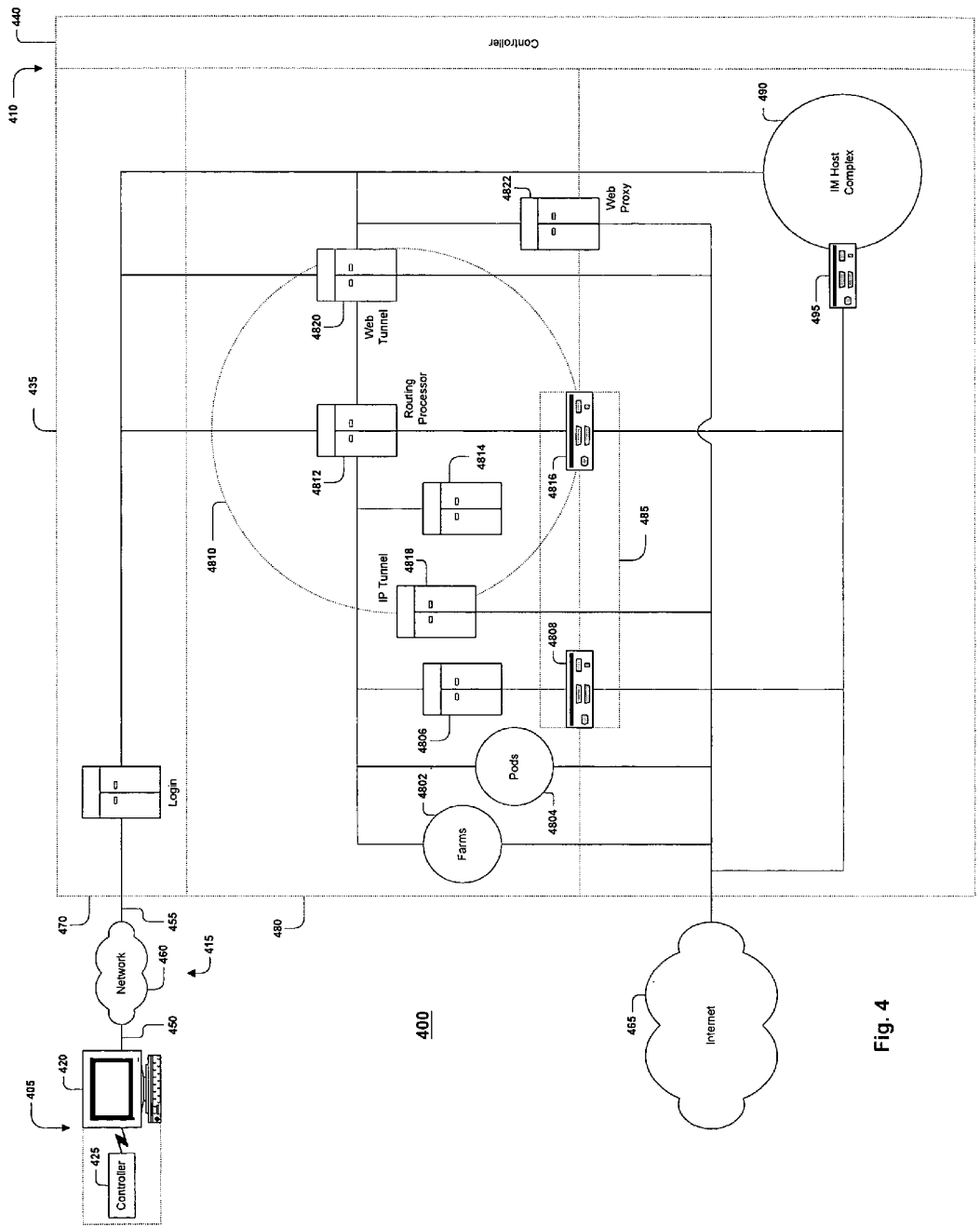

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communication system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and illustrates one possible embodiment of the host systems 110, 210, and 310 shown in FIGS. 1-3, respectively. However, FIG. 4 describes an aspect of the host system 410, focusing primarily on one particular implementation of OSP host complex 480. For purposes of communicating with an OSP host complex 480, the delivery network 460 is generally a telephone network.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. However, in other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communication between the OSP host complex 480, the IM host complex 490, and the Internet 465.

The OSP host complex 480 supports a set of services from one or more servers located internal to and external from the OSP host complex 480. Servers external to the OSP host complex 480 generally may be viewed as existing on the Internet 465. Servers internal to the OSP complex 480 may be arranged in one or more configurations. For example, servers may be arranged in large centralized clusters known as farms 4802 or in localized clusters known as pods 4804.

Farms 4802 are groups of servers located at centralized locations within the OSP host complex 480. Farms 4802 generally are dedicated to providing particular functionality and services to subscribers and clients from a centralized location, regardless of the location of the subscriber or client. Farms 4802 are particularly useful for providing services that depend upon other processes and services for information, such as, for example, chat, email, instant messaging, news, newsgroups, search, stock updates, and weather. Thus, farms 4802 tend to rely on connections with external resources such as the Internet 465 and/or other servers within the OSP host complex 480.

To reduce the time delays and congestion inherent in centralized processing, some services offered by the OSP host complex 480 are provided from localized servers, generally known as pods 4804. Each pod 4804 includes one or more interrelated servers capable of operating together to provide one or more services offered by the OSP host complex 480 in a geographically localized manner, the servers within a pod 4804 generally operating independently rather than relying on resources external to the pod 4804 to operate. A pod 4804 may cache content received from external sources, such as farms 4802 or the Internet 465, making frequently requested information readily available to local subscribers served by the pod 4804. In this way, pods 4804 are particularly useful in providing services that are independent of other processes and servers such as, for example, routing, keywords, and downloading certain software and graphical interface updates with reduced processing time and congestion. The determination of which servers and processes are located in the pod 4804 is made by the OSP according to load distribution, frequency of requests, demographics, and other factors.

In addition to farms 4802 and pods 4804, the implementation of FIG. 4 also includes one or more non-podded servers 4806. In general, the non-podded server 4806 may be dedicated to performing a particular service that relies on other processes and services for information and may be directly or indirectly connected to resources outside of the OSP host complex 480, such as the Internet 465 and the IM host complex 490, through an OSP gateway 4808. In the event that subscriber usage of the particular service is relatively high, the non-podded server 4806 may be included in a farm.

In the implementation of FIG. 4, a pod 4810, shown in more detail, includes a routing processor 4812. In a packet-based implementation, the client system 405 may generate information requests, convert the requests into data packets, sequence the data packets, perform error checking and other packet-switching techniques, and transmit the data packets to the routing processor 4812. Upon receiving data packets from the client system 405, the routing processor 4812 may directly or indirectly route the data packets to a specified destination within or outside of the OSP host complex 480. In general, the routing processor 4812 will examine an address field of a data request, use a mapping table to determine the appropriate destination for the data request, and direct the data request to the appropriate destination.

For example, in the event that a data request from the client system 405 can be satisfied locally, the routing processor 4812 may direct the data request to a local server 4814 in the pod 4810. In the event that the data request cannot be satisfied locally, the routing processor 4812 may direct the data request internally to one or more farms 4802, one or more other pods 4804, or one or more non-podded servers 4806 in the OSP host complex 480, or may direct the data request externally to the Internet 465 or the IM host complex 490 through an OSP/pod gateway 4816.

The routing processor 4812 also may direct data requests and/or otherwise facilitate communication between the client system 405 and the Internet 465. In one implementation, the client system 405 uses an OSP client application to convert standard Internet content and protocols into OSP protocols and vice versa. For example, when a browser application transmits a request in standard Internet protocol, the OSP client application can intercept the request, convert the request into an OSP protocol and send the converted request to the routing processor 4812 in the OSP host complex 480. The routing processor 4812 recognizes the Internet 465 as the destination and routes the data packets to an IP ("Internet Protocol") tunnel 4818. The IP tunnel 4818 converts the data from the OSP protocol back into standard Internet protocol and transmits the data to the Internet 465. The IP tunnel 4818 also converts the data received from the Internet in the standard Internet protocol back into the OSP protocol and sends the data to the routing processor 4812 for delivery back to the client system 405. At the client system 405, the OSP client application converts the data in the OSP protocol back into standard Internet content for communication with the browser application.

The IP tunnel 4818 may act as a buffer between the client system 405 and the Internet 465, and may implement content filtering and time saving techniques. For example, the IP tunnel 4818 can check parental controls settings of the client system 405 and request and transmit content from the Internet 465 according to the parental control settings. In addition, the IP tunnel 4818 may include a number a caches for storing frequently accessed information. If requested data is determined to be stored in the caches, the IP tunnel 4818 may send the information to the client system 405 from the caches and avoid the need to access the Internet 465.

In another implementation, the client system 405 may use standard Internet protocols and formatting to access the pod 4810 and the Internet 465. For example, the subscriber can use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol") and routed to a web tunnel 4820. The web tunnel 4820 may be a L2TP ("Layer Two Tunneling Protocol") tunnel capable of establishing a point-to-point protocol (PPP) session with the client system 405. The web tunnel 4820 provides a gateway to the routing processor 4812 within the pod 4810, the Internet 465, and a web proxy 4822.

The web proxy 4822 can look up subscriber information from the IP address of the client system 405 to determine the subscriber's parental controls settings and other demographic information. In this way, the web proxy 4822 can tailor the subscriber's content and user interfaces. The web proxy 4822 can also perform caching functions to store certain URLs ("Uniform Resource Locators") and other electronic content so that the web proxy 4822 can locally deliver information to the client system 405 and avoid the need to access the Internet 465 in the event that data requested by the client system 405 has been cached.

Figure 5:
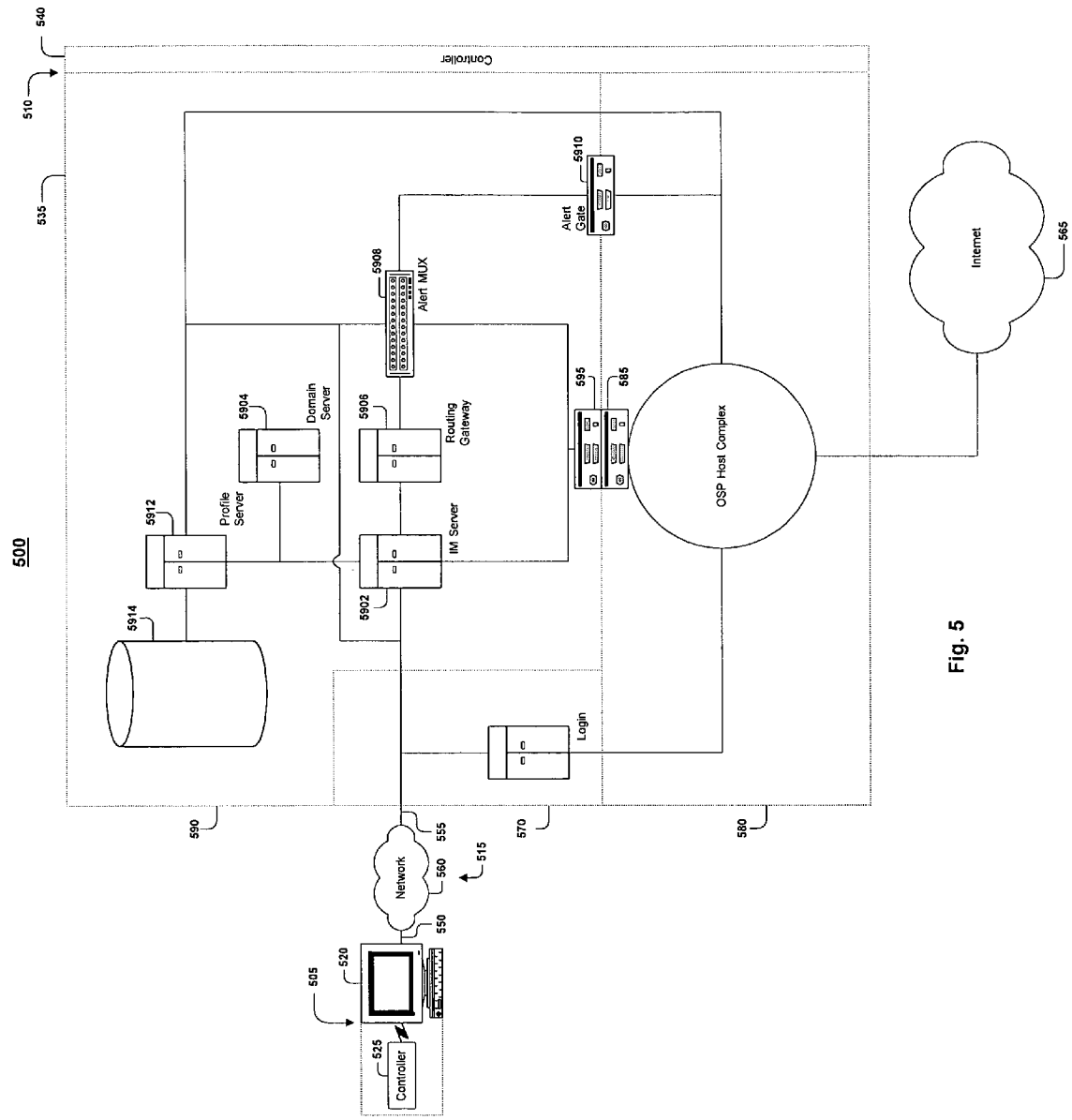

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communication system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible embodiment of the host systems 110, 210, 310, and 410 shown in FIGS. 1-4, respectively. However, FIG. 5 describes an aspect of the host system 510, focusing primarily on one particular implementation of IM host complex 590. For purposes of communicating with the IM host complex 590, the delivery network 560 is generally a telephone network.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application, and/or an Internet browser application for communicating with the OSP host complex 580 and the Internet 565, respectively.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a Winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

In the implementation of FIG. 5, the IM server 5902 is directly or indirectly connected to a routing gateway 5906. The routing gateway 5906 facilitates the connection between the IM server 5902 and one or more alert multiplexors 5908, for example, by serving as a link minimization tool or hub to connect several IM servers to several alert multiplexors. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing another hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie). The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert multiplexor 5908 also may communicate with the OSP host complex 580 through the IM gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Upon detecting an alert feed, the alert gate 5910 contacts the alert multiplexor 5908, which in turn, informs the client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using new or a different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 590 to share subscriber profile data with other services. Alternatively, user profile data may be saved locally on the client device 505.

Figure 6:
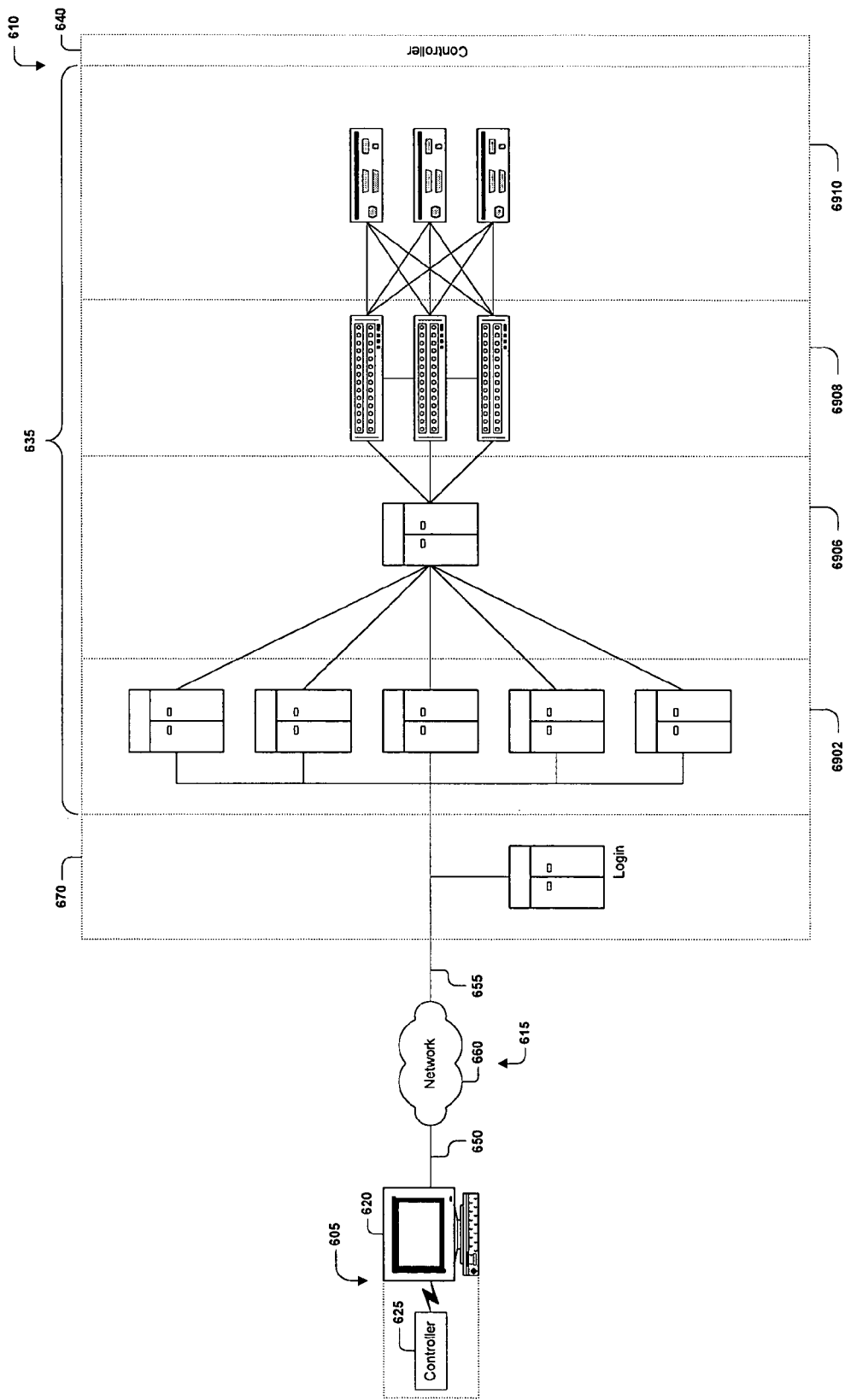

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communications link 615 may include communication pathways 650, 655 enabling communications through the one or more delivery networks 660.

Examples of each element within the communication system of FIG. 6 are broadly described above with respect to FIGS. 1-5. In particular, the client system 605 and the communications link 615 typically have attributes comparable to those described with respect to client systems 105, 205, 305, 405 and 505 and communications links 115, 215, 315, 415 and 515 of FIGS. 1-5. Likewise, the host system 610 of FIG. 6 may have attributes comparable to and illustrates one possible embodiment of the host systems 110, 210, 310, 410 and 510 shown in FIGS. 1-5, respectively. However, FIG. 6 describes an aspect of the host system 610, focusing primarily on one particular implementation of IM host complex 690. For purposes of communicating with the IM host complex 690, the delivery network 660 is generally a telephone network.

The client system 605 includes a client device 620 and a client controller 625. The client controller 625 is generally capable of establishing a connection to the host system 610, including the IM host complex 690. In one implementation, the client controller 625 includes an IM application for communicating with servers in the IM host complex 690 utilizing exclusive IM protocols.

The host system 610 includes a host device 635 and a host controller 640. The host controller 640 is generally capable of transmitting instructions to any or all of the elements of the host device 635. For example, in one implementation, the host controller 640 includes one or more software applications loaded on one or more elements of the host device 635. However, in other implementations, as described above, the host controller 640 may include any of several other programs, machines, and devices operating independently or collectively to control the host device 635.

The host system 610 includes a login server 670 capable of enabling communications with and authorizing access by client systems 605 to various elements of the host system 610, including the IM host complex 690. The IM host complex 690 includes an IM server network 6902 and an alert multiplexor network 6908. The IM server network 6902 is an interconnected network of IM servers and the alert multiplexor network 6908 is an interconnected network of alert multiplexors. Each IM server and each alert multiplexor can directly or indirectly communicate and exchange information with all of the IM servers in the IM server network 6902 and all of the alert multiplexors in the alert multiplexor network 6908. Each of the alert multiplexors in the alert multiplexor network 6908 is connected to several alert gates 6910 that receive different types of alerts. In the implementation of FIG. 6, the IM server network 6902 and the alert multiplexor network 6908 are interconnected by a routing gateway 6906 that serves as a common hub to reduce the number of connections.

A subscriber typically will be assigned to one IM server in the IM server network 6902 and to one alert multiplexor in the alert multiplexor network 6908 during a session based on one or more hashing techniques. However, the IM servers and the alert multiplexors are capable of storing subscriber information and other electronic content that may be accessed by the other IM servers and alert multiplexors. In one implementation, for example, each IM server in the IM server network 6902 may be dedicated to serving a particular set of registered subscribers. Because all of the IM servers can communicate with each other, all subscribers can communicate with each other through instant messaging. In another implementation, each alert multiplexor in the alert multiplexor network 6908 may be dedicated to storing information about a particular set or subset of alerts. Because all of the alert multiplexors can communicate with each other, all registered subscribers can receive all types of alerts. This networking arrangement enables the load to be distributed among the various servers in the IM host complex 690 while still enabling a subscriber to communicate, share information, or otherwise interact with other subscribers and servers in the IM host complex 690.

Figure 7:
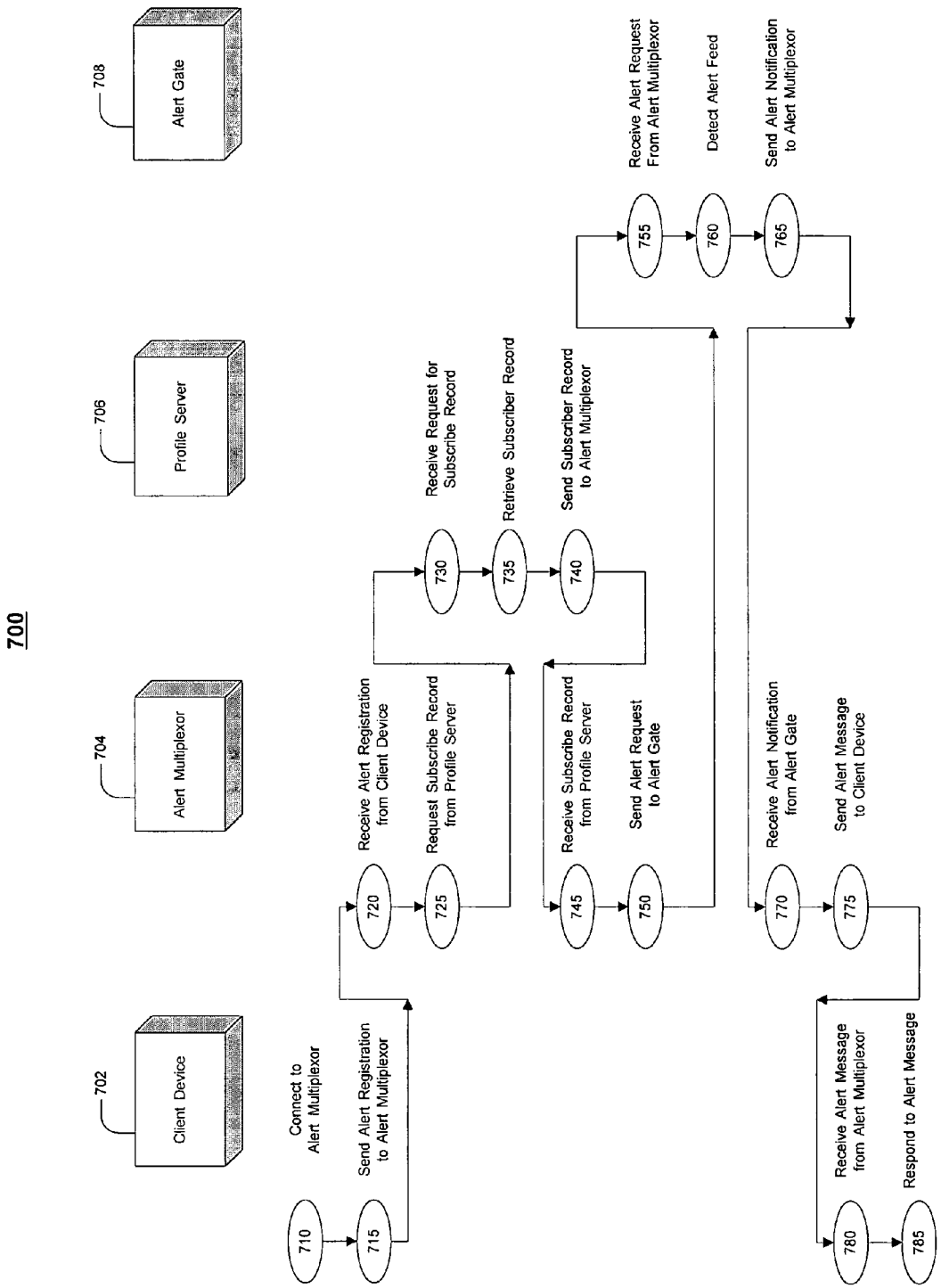
FIG. 7 is a flow chart of a communications method.

Referring to FIG. 7, a client device 702, an alert multiplexor 704, a profile server 706, and an alert gate 708 interact according to a procedure 700 to deliver an alert message to a subscriber. The procedure 700 may be implemented by any type of hardware, software, device, computer, computer system, equipment, component, program, application, code, storage medium, or propagated signal.

Initially, a subscriber may use the client device 702 to connect to the alert multiplexor 704 (step 710). Typically, the client device 702 will include an installed IM client application and will be equipped with a Winsock API that enables the client device 702 to establish an open TCP connection to the alert multiplexor 704. It also may be necessary to perform one or more hashing techniques to identify the alert multiplexor 704 to be used for the subscriber's session.

Once a connection to the alert multiplexor 704 has been established, a subscriber may use the client device 702 to send an alert registration to the alert multiplexor 704 (step 715). The alert registration may inform the alert multiplexor 704 that the subscriber desires to enable the alert capabilities of the alert multiplexor 704. The alert multiplexor 704, in turn, may receive the alert registration from the client device 702 (step 720) and enable the alert capabilities such as, for example, stock alerts, mail alerts, weather alerts, calendar alerts, news alerts, third party alerts, or any other comparable type of alert.

A subscriber may also use the client device 702 to generate a subscriber record that includes the particular types of alerts desired by the subscriber and other alert preferences. The alert preferences may include the conditions for tripping the alerts, the timing of the alerts, and/or the presentation method of the alerts. In general, alert messages may take the form of an instant message, an icon, a pop-up window, and/or an audio alarm that appears during a subscriber's IM session. A subscriber also may choose to receive offline notification of alerts, so that the subscriber may be informed of certain changes in state even when the subscriber is not running the IM client application. For example, a subscriber may set up alert preferences to request notification, for example, by telephone, email, or pager.

In one implementation, an IM client application installed on a client device 702 may generate a URL based on the subscriber record. The URL may specify, for example, the protocol, the site name, and a path that corresponds to the alert preferences. The client device 702 may use a browser application, such as, for example, an embedded HTTP engine in the IM client application, to navigate to the URL to directly or indirectly retrieve data corresponding to particular types of alerts.

Typically, a subscriber will generate a subscriber record during an initial session by interacting with UIs ("User Interfaces") presented on the client device 702. The subscriber record may be stored locally on the client device 702 so that the subscriber does not have to reenter the alert preferences for subsequent sessions unless, of course, the subscriber is using a different client device or desires to change alert preferences. Additionally, the subscriber record may be persistently stored in a centralized database in the host system.

In the event that the subscriber record is stored in a database in the host system, the alert multiplexor 704 may request the subscriber record from the profile server 706 (step 725). The profile server 706 may receive the request for the subscriber record (step 730), retrieve the subscriber record from the database (step 735), and send the subscriber record to the alert multiplexor 704 (step 740).

The alert multiplexor 704 receives the subscriber record from the profile server 706 (step 745) and then communicates with the alert gate 708. In one implementation, the alert multiplexor 704 may send an alert request to the alert gate 708 based on the subscriber record (step 750). Namely, the alert multiplexor 704 may instruct the alert gate 708 to start searching for alert feeds corresponding to any alerts designated in the subscriber record and/or to send alert notifications when an alert feed corresponding to any alerts designated in the subscriber record is detected. The alert gate 708 receives the alert request from the alert multiplexor 704 (step 755) and, in response, searches for and detects alert feeds (step 760).

In another implementation, the alert gate 708 continuously searches for a particular type of alert feed. The alert gate 708 may be loaded with a software program or piece of code that instructs the alert gate 708 to detect a particular alert feed from a remote server, such as, for example, a remote server in an OSP complex or the Internet. The alert feed may correspond to one subscriber or a group of subscribers depending upon load distribution. Typically, the remote server will be loaded with a software program or piece of code that instructs the server to broadcast an alert feed based on some triggering event to one or more specified alert gates. The broadcast of the alert feed may be a continuous or periodic broadcast of the state, may be a broadcast in response to a change in state, or may be a broadcast in response to a status inquiry (e.g., polling). As used herein, state refers to any condition of being that may be represented by the remote server. A change in state can be any updated condition of being and may be internal or external to the remote sever.

Upon detecting the alert feed (step 760), the alert gate 708 may send an alert notification to the alert multiplexor 704 (step 765). The alert notification will inform the alert multiplexor 704 of the alert feed, the condition that triggered the alert feed, and/or the need to contact a particular subscriber. In one implementation, the alert gate 708 may send an alert notification to an alert multiplexor 704 that is associated with a particular subscriber during a session. This is typically the case for alerts relating to personalized information such as, for example, mail alerts and calendar alerts. In another implementation, the alert gate 708 may send an alert notification to an alert multiplexor 704 that that is associated with a particular type of alert. This is generally the case for alerts relating to information of interest to a large number of subscribers, such as, for example, stock alerts, weather alerts, news alerts, and third party alerts.

Typically, the alert multiplexor 704 will be loaded with a software program or piece of code for instructing the alert multiplexor 704 to receive and/or retrieve messages from the alert gate 708. The alert multiplexor 704 may be set to continuously or periodically receive and/or retrieve messages the alert gate 708. The alert multiplexor 704 may receive the alert notification from the alert gate 708 (step 770), and may then determine whether the alert notification corresponds to an alert of interest to a registered subscriber. In the event that a subscriber has requested notification about the particular alert feed, the alert multiplexor 704 sends an alert message to the client device 702 of the registered subscriber (step 775). If the subscriber has requested offline notification about the particular alert, the alert multiplexor 704 may send an alert message to the appropriate offline device of the subscriber. The alert message may contain information about the alert feed and/or the condition that triggered the alert feed. The alert multiplexor 704 alone or in conjunction with other servers may perform sorting, prioritizing, or other types of organizational processing on the alert messages so that the client device 702 is notified in an optimal fashion.

The client device 702 receives the alert message from the alert multiplexor 704 (step 780), and then responds to the alert message (step 785). For example, the subscriber may use the client device 702 to generate a response appropriate to the particular alert feed or triggering condition. Alternatively, the client device 702 may respond automatically to particular alert feeds and/or triggering conditions in a defined manner.

Figure 8:
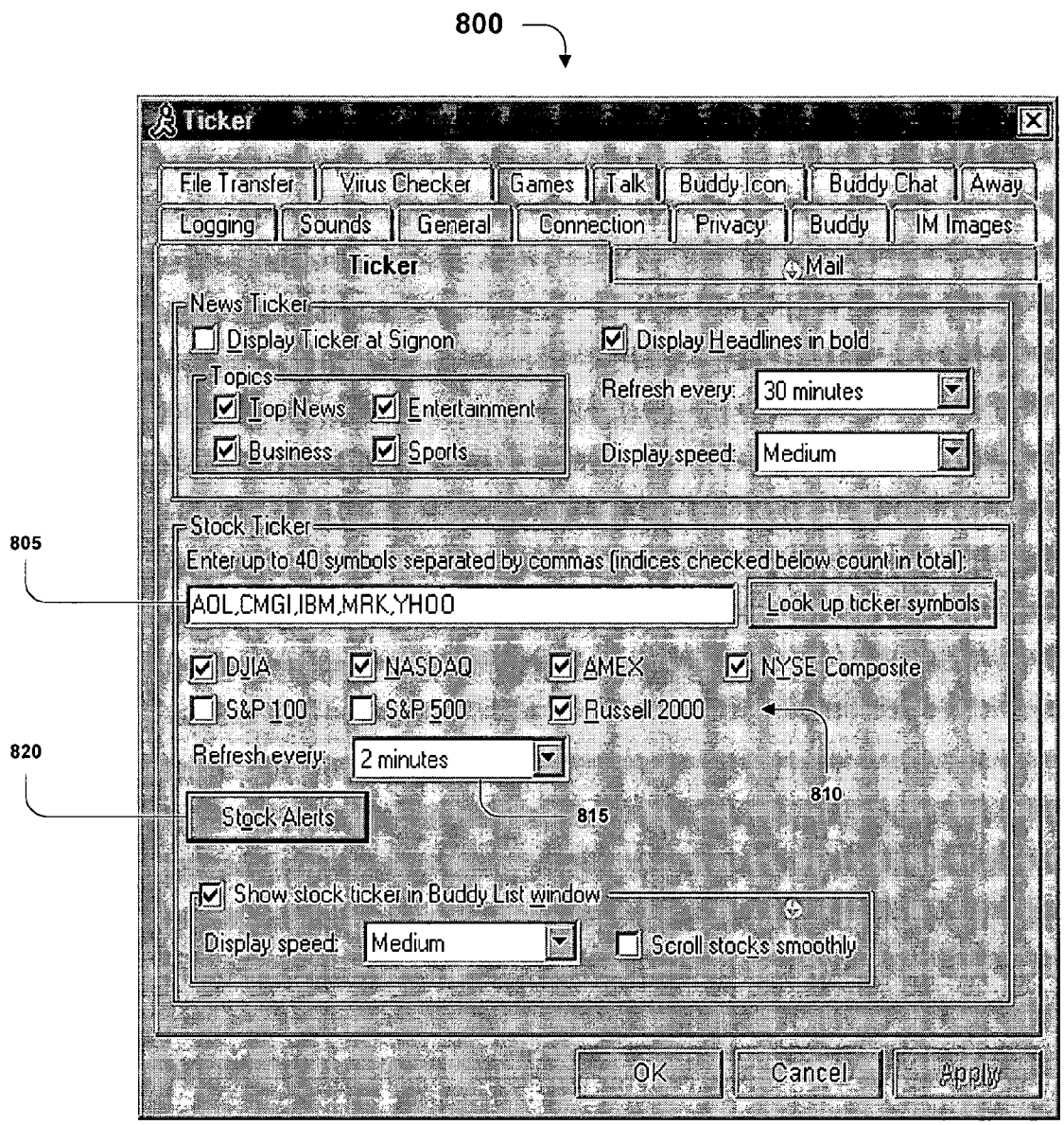
FIGS. 8-14 are illustrations of different graphical user interfaces.
Figure 9:
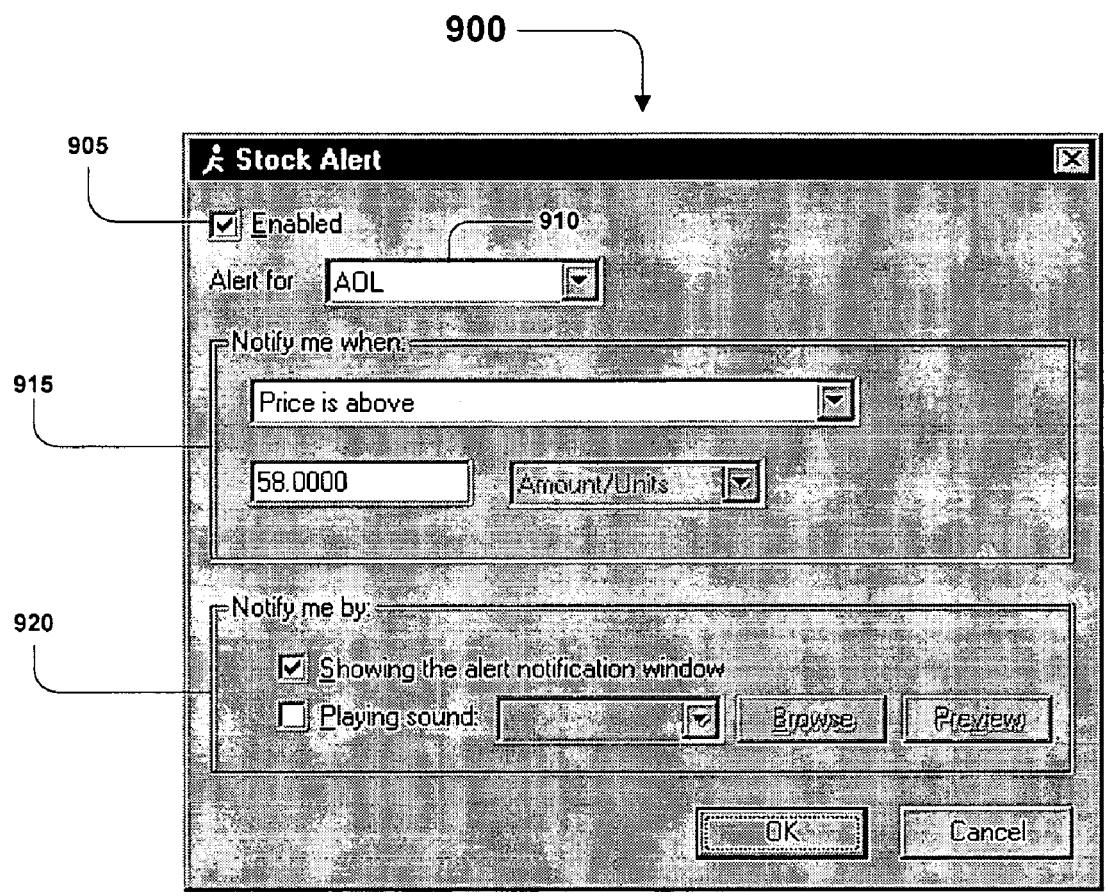
Figure 10:
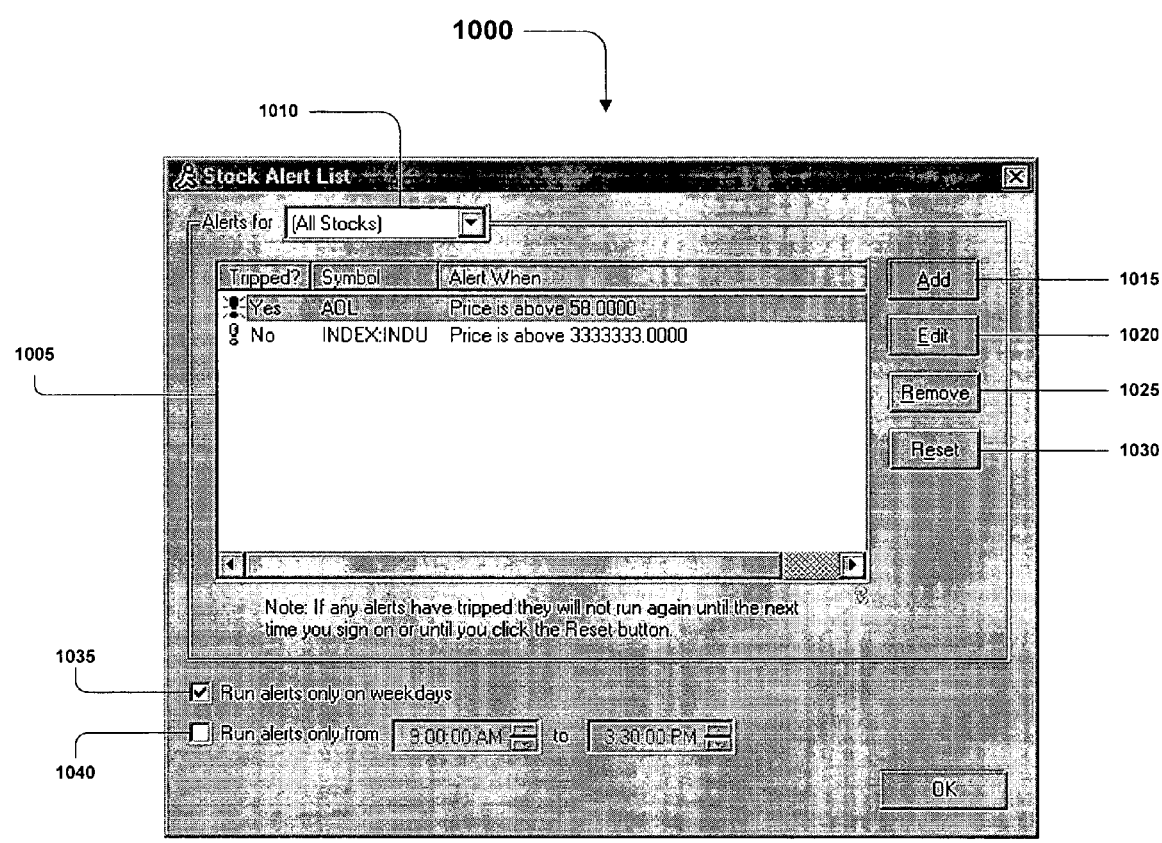

A stock alert is one example of an alert message that may be requested by a subscriber. FIGS. 8-10 illustrate several different UIs that may be used to set a subscriber's stock alert preferences by selecting certain options of and inputting information into the fields of the UIs.

Referring to FIG. 8, a UI 800 may include a ticker symbol field 805 for entering the ticker symbol of one or more stocks to track and an index field 810 for selecting one or more stock indexes to track. The UI also may include a refresh field 815 for designating the interval at which the stock data is updated. The UI 800 may further include a stock alert button 820 for setting and editing stock alert preferences.

Referring to FIG. 9, a UT 900 may include an enabled field 905 for enabling a stock alert for a particular stock and a stock selection field 910 for selecting a particular stock to trip a stock alert message. The UI 900 also may include a notification field 915 for selecting the conditions that trip the stock alert. Typically, a stock alert will be tripped based on price and/or volume, such as, for example, when the price exceeds a certain level, is below a certain level, is above the 52 week high, is below 52 week low, or is above or below a previous close by a certain amount, or when the volume of trading is above or below a certain amount. The UI 900 also may include an alert presentation field 920 for selecting the manner in which an alert message is presented to a subscriber, for example, by showing an alert notification window and/or playing a sound.

Referring to FIG. 10, a UI 1000 may include a display field 1005 for showing whether a stock alert has been tripped, the ticker symbol of the stock, and the conditions that trip the stock alert. The UI 1000 also may include an alert selection field 1010 for selecting which of the stock alerts to display.

The UI 1000 may include an add button 1015, an edit button 1020, and a remove button 1025 for adding, editing and removing certain stock alerts and may include a reset button 1030 for resetting a stock alert that has been tripped. The UI 1000 also may include a day selection field 1035 and time selection field 1040 for selecting when to run the stock alerts, for example, only on certain days and/or only at certain times during the day.

Figure 11:
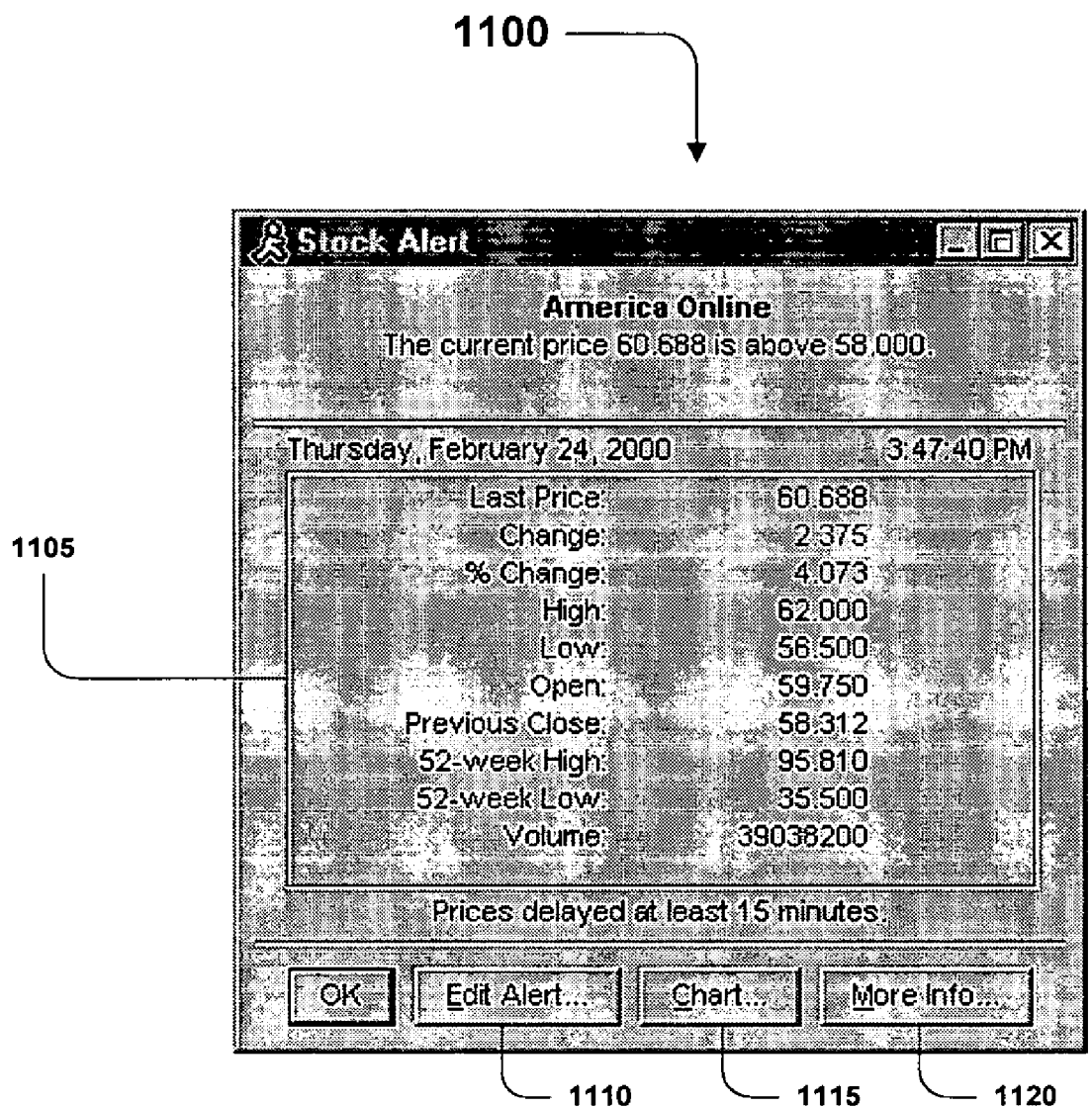

Referring to FIG. 11, a UI 1100 illustrates a stock alert message that may be presented to a subscriber. The stock alert message may be any type of instant message, pop-up window, icon and/or audible alarm capable of getting a subscriber's attention. The stock alert message may include an information field 1105 containing information such as the last price, the dollar change, the percent change, the high, the low, the open, the previous close, the 52 week high, the 52 week low, and/or the trading volume. The UI 1100 also may include an edit button 1110 for editing the presentation of the alert, a chart button 1115 for displaying a stock performance chart, and a more information button 1120 for linking to OSP or Internet websites that provide more detailed information about the particular stock, financial advice, and/or contact information for online or offline stock brokers.

As the stock market fluctuates, a stock alert server, for example, in an OSP host complex or the Internet, broadcasts a stock alert feed to indicate the changing stock prices. The stock alert feed may correspond to one stock, a group of stocks, or all stocks depending upon load distribution. A stock alert gate detects the stock alert feed and then, alone or in conjunction with one or more alert multiplexors, sorts and sends alert notifications to an alert multiplexor network. Each alert multiplexor in the alert multiplexor network may be dedicated to stock alerts for a certain set of stock ticker symbols and for a certain set of registered subscribers. By communicating with each other, all of the alert multiplexors in the alert multiplexor network have access to information including the complete set of subscribers registered to receive stock alerts, the selected stocks of each registered subscriber, the alert multiplexor and the IM server dedicated to each subscriber during a session, and the alert multiplexors dedicated to the selected stocks. Based on this information, the alert multiplexor network can send, deliver, retrieve, and/or receive stock alert notifications corresponding to all of the stocks selected by all of the registered subscribers and may command the IM client application of each registered subscriber to display an appropriate stock alert message.

Figure 12:
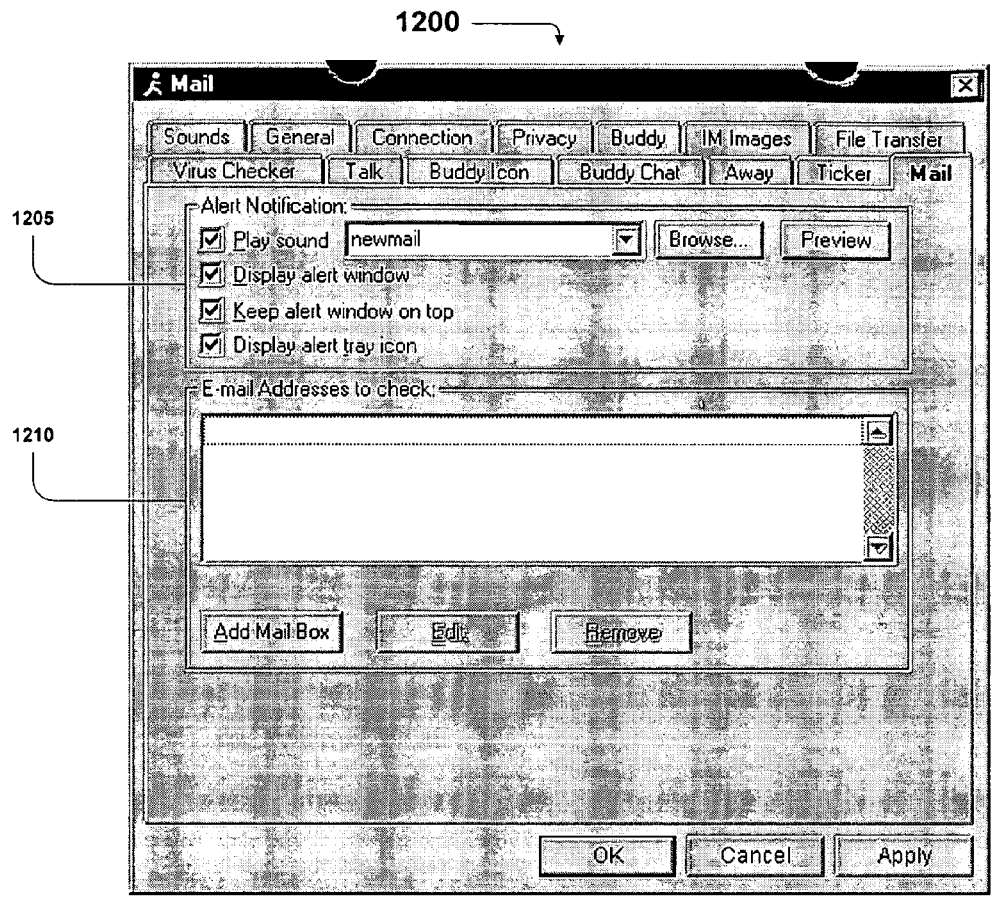
Figure 13:
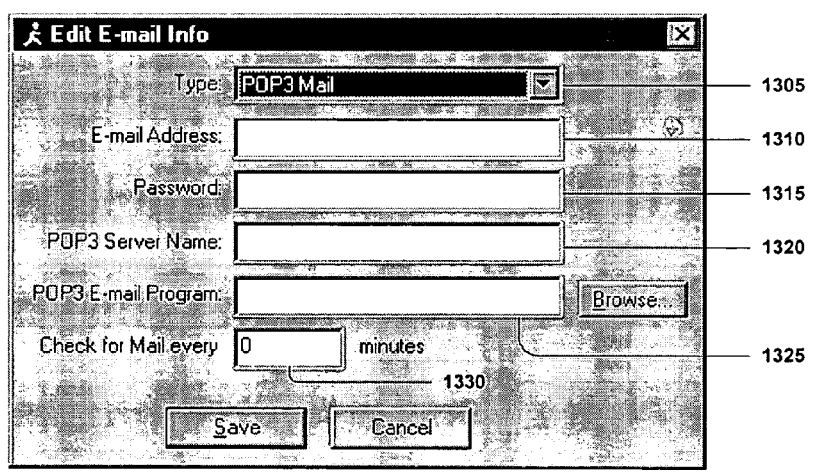

A mail alert is another example of an alert message that may be requested by a subscriber. FIGS. 12 and 13 illustrate different UIs that may be used to set a subscriber's mail alert preferences by selecting certain options and inputting information into the fields of the UIs.

Referring to FIG. 12, a UI 1200 may include an alert notification field 1205 for setting and editing certain mail alert preferences including the manner in which an alert message is presented to a subscriber, for example, by showing an alert notification window and/or playing a sound. The UI 1200 also may include an email address display field 1210 for showing the email addresses that trip a mail alert. The UI 1200 may include an add mail box button 1215, an edit button 1220, and a remove button 1225 for adding, editing and removing email addresses that trip a mail alert.

Referring to FIG. 13, a UI 1300 may include a type field 1305 for entering the type of email account, e.g., a POP3 mail account, and an email address field 1310 for entering the type and address of an email account that trips a mail alert. The UI 1300 also may include a password field 1315 for entering the password to the email account, a server name field 1320 for entering the name of the server for the email account, a program field 1325 for entering the program used to access the email account, and a time field 1330 for entering the interval at which the email account is checked.

Figure 14:
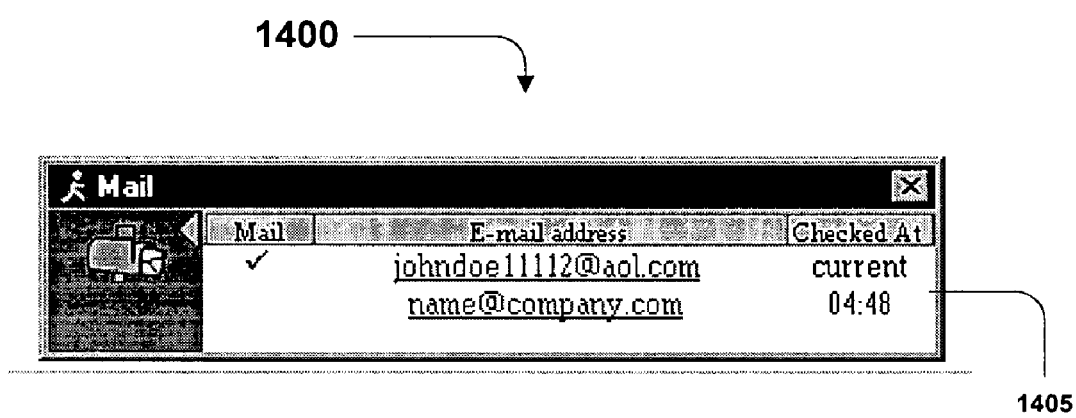

Referring to FIG. 14, a UI 1400 illustrates a mail alert message that may be presented to a subscriber. The mail alert message may be any type of instant message, pop-up window, icon and/or audible alarm capable of getting a subscriber's attention. The mail alert message may include an information field 1405 containing information such as one or more email addresses, whether each of the email address contains unread email, and when the email address was last checked for unread email.

As email messages are received, a mail alert server, for example, in an OSP host complex or the Internet, broadcasts a mail alert feed to indicate changing mail status. The mail alert feed may correspond to one subscriber, a group of subscribers, or all subscribers depending upon load distribution. The mail alert feed is sent to a mail gateway that performs any necessary protocol conversion and then directs the mail alert feed to a mail alert gate.

The mail alert gate detects the mail alert feed and then, alone or in conjunction with one or more alert multiplexors, sorts and sends mail alert notifications to an alert multiplexor network. Each alert multiplexor in the alert multiplexor network may be dedicated to receiving mail alert notifications for a certain set of registered subscribers. Upon receiving a mail alert notification, the alert multiplexor examines whether the mail alert notification corresponds to any of its subscribers. In the event that the alert notification is for one of its subscribers, the alert multiplexor commands the IM client application running on the subscriber's client device to indicate that the subscriber has unread email. Once notified, the subscriber may use the client device to read the email message, typically with an email client application.

Email messages are received and/or stored by a mail server alone or in cooperation with a mail repository. The mail server and mail repository may be part of an OSP host complex or any type of server capable of receiving and/or storing email whether internal or external to the OSP host complex. Email messages may be received and stored from any type of email account including, but not limited to an OSP based email account, an ISP based email account, a Web-based email account, and a POP3 email account.

A third party alert is another example of alert message that may be requested by a subscriber. A third party is broadly understood to include any individual or business entity that provides goods or services. In general, a subscriber may register to receive alerts from one or more third parties that provide a certain category of services. In one implementation, the OSP queries subscribers as to whether they would like to receive various categories of third party alerts. For example, the OSP may partner with various suppliers of computer merchandise and may query subscribers as to whether they would like to receive alerts from any or all third parties that supply computer merchandise. In another implementation, a subscriber may register to receive an alert message at a third party's web site. Once a subscriber has registered to receive the alert, the third party directly or indirectly sends to the subscriber an alert including, for example, a promotional advertisement, a coupon, a notification that an order is done and/or a service is complete, and a message regarding confirmation, cancellation, and/or rescheduling of an appointment.

A weather alert is another example of an alert message that may be requested by a subscriber. In one implementation, a subscriber may register to receive an alert message that informs the subscriber of a weather forecast and/or adverse weather conditions in a particular geographic region.

A calendar alert is another example of an alert message that may be requested by a subscriber. In general, a subscriber may register to receive an alert message that informs the subscriber of important dates, holidays and/or other special occasions. A calendar alert may be provided to a subscriber in any manner as described herein.

A news alert is another example of an alert message that may be requested by a subscriber. In one implementation, a subscriber may register to receive an alert message that informs the subscriber of selected news items or a listing of Internet or online sites (links) related to selected news items. A news alert may be provided to a subscriber in any manner as described herein.

Other embodiments are within the scope of the following claims.

What is claimed is:

1. A communications system, comprising:
   multiple alert gates, each alert gate being configured to detect a different type of alert feed corresponding to a particular type of alert; and
   an alert multiplexer connected to the alert gates and operable to receive detected alerts from the alert gates and to deliver the detected alerts over an open TCP connection to a client system associated with a user of the communications system.

2. The communications system of claim 1, wherein the alert multiplexer is configured to maintain a record of alert types registered for by the user of the communications system.

3. The communications system of claim 1, wherein the user comprises a subscriber of an instant messaging system, and the alert multiplexer delivers one or more detected alerts to the subscriber through the instant messaging system.

4. The communications system of claim 1, wherein the user comprises a subscriber of an online service provider, and the alert multiplexer delivers one or more detected alerts to the subscriber through the online service provider.

5. The communications system of claim 1, further comprising multiple alert multiplexers, wherein the alert multiplexer is assigned to a user according to a hashing technique.

6. The communications system of claim 1, further comprising:
   an instant messaging server connected to the alert multiplexer, the instant messaging server and the alert multiplexer being assigned to the user of the communications system.

7. The communications system of claim 6, wherein the instant messaging server is assigned to the user according to a hashing technique.

8. The communications system of claim 6, wherein the instant messaging server is connected to the alert multiplexer through a routing gateway.

9. The communications system of claim 1, wherein at least one of the alert gates detects an alert feed from a remote server.

10. The communications system of claim 9, wherein the at least one alert gate sends a status inquiry to the remote server.

11. The communications system of claim 9, wherein the remote server comprises a mail server.

12. The communications system of claim 9, wherein the remote server comprises a stock server.

13. The communications system of claim 9, wherein the remote server is a third party server.

14. The communications system of claim 9, wherein the remote server comprises a weather server.

15. The communications system of claim 9, wherein the remote server comprises a news server.

16. The communications system of claim 9, wherein the remote server comprises a calendar server.

17. The communications system of claim 1 further comprising an alert multiplexer network having multiple alert multiplexers including the alert multiplexer and the alert multiplexer being configured to communicate with all alert multiplexers in the alert multiplexer network.

18. The communications system of claim 1, wherein at least one type of alert feed contains information related to a group and the alert multiplexer is dedicated to receiving information related to certain members of the group.

19. The communications system of claim 18, wherein the group comprises a group of users.

20. The communications system of claim 18, wherein the group comprises a group of stocks.

21. The communications system of claim 18, wherein the group comprises a group of third parties.

22. The communications system of claim 18, wherein the group comprises a group of cities.

23. A communications system, comprising:
an alert gate configured to detect an alert feed corresponding to a particular type of alert;
an alert multiplexer connected to the alert gate and operable to receive detected alerts from the alert gate and to deliver the detected alerts to a user of the communication system; and
an instant messaging server connected to the alert multiplexer, the instant messaging server and the alert multiplexer being assigned to the user of the communications system.

24. The communications system of claim 23, wherein the alert multiplexer is configured to maintain a record of alert types for which the user of the communications system has registered.

25. The communications system of claim 23, wherein the instant messaging server is assigned for use by certain users according to a hashing technique.

26. The communications system of claim 23, wherein the alert multiplexer is assigned for use by certain users according to a hashing technique.

27. The communications system of claim 23, wherein the instant messaging server is connected through a routing gateway to the alert multiplexer.

28. The communications system of claim 23, further comprising:
an instant messaging server network having multiple instant messaging servers including the instant messaging server; and
an alert multiplexer network having multiple alert multiplexers including the alert multiplexer,
wherein at least one instant messaging server and at least one alert multiplexer are configured to communicate with all instant messaging servers in the instant messaging server network and all alert multiplexers in the alert multiplexer network.

29. The communications system of claim 23, wherein at least one type of alert feed contains information related to a group and the alert multiplexer is dedicated to receiving information related to certain members of the group.

30. The communications system of claim 29, wherein the group comprises a group of users.

31. The communications system of claim 29, wherein the group comprises a group of stocks.

32. The communications system of claim 29, wherein the group comprises a group of cities.

33. The communications system of claim 23, wherein the alert gate detects the alert feed from a remote server.

34. The communications system of claim 33, wherein the alert gate sends a status inquiry to the remote server.

35. The communications system of claim 33, wherein the remote server comprises a mail server.

36. The communications system of claim 33, wherein the remote server comprises a stock server.

37. The communications system of claim 33, wherein the remote server comprises a weather server.

38. The communications system of claim 33, wherein the remote server comprises a news server.

39. The communications system of claim 33, wherein the remote server comprises a calendar server.

40. A communications method comprising:
detecting, at an alert gate, an alert feed corresponding to an alert indicative of a change in state at a remote server;
receiving, at an alert multiplexer, a detected alert from the alert gate; and
delivering, by at least one computer, the detected alert over an open TCP connection to a client system associated with a user of the communication system who has requested to receive the alert.

41. The communications system of claim 1, wherein the open TCP connection is established using an encrypted key.

42. The communications system of claim 23, wherein the alert multiplexer is configured to deliver the detected alerts over an open TCP connection to a client system associated with the user.

43. The communications system of claim 42, wherein the open TCP connection is established using an encrypted key.

44. An instant messaging system with alert capabilities, the instant messaging system comprising:
an alert gate configured to detect an alert feed corresponding to a particular type of alert;
an instant messaging server in communication with an alert multiplexer, the instant messaging server configured to enable a client system associated with a user of the communications system to establish an open TCP connection with the alert multiplexer; and
the alert multiplexer connected to the alert gate and operable to receive a detected alert from the alert gate and send over the open TCP connection a message to the client system based on the detected alert.

45. The instant messaging system of claim 44, wherein the instant messaging server is also configured to establish an open TCP connection with the client system and provide instant messaging services over the open TCP connection.

46. The instant messaging system of claim 44, wherein the open TCP connection is established using an encrypted key.

47. The instant messaging system of claim 1, further comprising multiple alert multiplexers configured to communicate with the instant messaging server.

48. The instant messaging system of claim 44, wherein the multiple alert multiplexers are configured to communicate with the instant messaging server through a routing gateway.

49. The instant messaging system of claim 44, wherein each of the multiple alert multiplexers are configured to store information about a particular set of alerts.

50. The instant messaging system of claim 44, wherein each of the multiple alert multiplexers is configured to store user information for a subset of the users of the instant messaging system.

51. The instant messaging system of claim 44, further comprising multiple instant messaging servers configured to communicate with the multiple alert multiplexers.

52. The instant messaging system of claim 51, wherein the multiple instant messaging servers are configured to communicate with the multiple alert multiplexers through one or more routing gateways.

53. The communications system of claim 1, wherein the open TCP connection is used to establish a one-to-one connection with the client system.

54. The communications system of claim 1, wherein the alert multiplexer is further configured to deliver the detected alerts over a one-to-one connection to a second client system, the one-to-one connection being established using another open TCP connection.

55. The communications method of claim 40, wherein the open TCP connection is used to establish a one-to-one connection with the client system.

56. The communications method of claim 40, further comprising delivering the detected alert over a one-to-one connection to a second client system, the one-to-one connection being established using another open TCP connection.

57. The instant messaging system of claim 44, wherein the open TCP connection is used to establish a one-to-one connection with the client system.

58. The instant messaging system of claim 44, wherein the alert multiplexer is further configured to send the message over a one-to-one connection to a second client system, the one-to-one connection being established using another open TCP connection.

* * * * *